United States Patent
Levy et al.

(10) Patent No.: US 7,212,369 B1
(45) Date of Patent: May 1, 2007

(54) METHOD AND APPARATUS FOR PERFORMING A SPIRAL SELF-SERVO WRITE OPERATION IN A DISK DRIVE USING AN AUTO DETECTION SCHEME

(75) Inventors: Lloyd Levy, San Jose, CA (US); Yu Sun, Fremont, CA (US); Pang L. Tan, Fremont, CA (US); Jingbo Yu, San Jose, CA (US); Adrian Cerda, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 10/920,717

(22) Filed: Aug. 16, 2004

Related U.S. Application Data

(60) Provisional application No. 60/495,581, filed on Aug. 15, 2003.

(51) Int. Cl.
    *G11B 21/02* (2006.01)
(52) U.S. Cl. .................................................. 360/75

(58) Field of Classification Search ................... None
    See application file for complete search history.

(56) References Cited

U.S. PATENT DOCUMENTS

2003/0197969 A1* 10/2003 Szita et al. .............. 360/77.08

OTHER PUBLICATIONS

U.S. Appl. No. 10/858,846, filed Jun. 2, 2004, Everett et al.
U.S. Appl. No. 10/859,058, filed Jun. 2, 2004, Rewerts et al.
U.S. Appl. No. 10/859,061, filed Jun. 2, 2004, Jeong et al.
U.S. Appl. No. 10/859,062, filed Jun. 2, 2004, Liikanen et al.

* cited by examiner

*Primary Examiner*—K. Wong
(74) *Attorney, Agent, or Firm*—Fellers, Snider, et al.

(57) ABSTRACT

A method and apparatus for providing a temporary utility zone in a disk drive. A disk surface has a write head associated therewith. The write head is used to write spiral servo information and a propagation state indicator onto the disk surface. The spiral servo information and propagation state indicator are used to perform a self-servo write operation on the disk surface.

74 Claims, 8 Drawing Sheets

Process Flow using Auto-deflection

Process Flow without using Auto-detection

Process Flow using Auto-declection

METHOD AND APPARATUS FOR PERFORMING A SPIRAL SELF-SERVO WRITE OPERATION IN A DISK DRIVE USING AN AUTO DETECTION SCHEME

CROSS-REFERENCE TO RELATED APPLICATIONS

Priority is claimed from U.S. Provisional Patent Application Ser. No. 60/495,581 filed Aug. 15, 2003, which is incorporated herein by reference in its entirety.

FIELD OF THE INVENTION

Embodiments of the present invention relate generally to data storage devices, such as disk drives. More particularly, the present embodiments relate to a method and apparatus for performing a spiral self-servo write operation in a disk drive using an auto detection scheme.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present embodiments presently uses a STW to write servo information in a spiral fashion (in at least some if its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the number of spirals of servo information to be written, rather than the number of tracks.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 1 inch per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

U.S. patent application Ser. No. 10/859,062 filed Jun. 2, 2004 (incorporated herein by reference) describes a method and apparatus for performing a self-servo write operation in a disk drive. Reference is now made to FIG. 6, which describes a self-servo write operation that is disclosed in the aforementioned patent application.

At a first station (e.g., a STW station), a STW is used to write spirals of servo information onto the disk surface by moving a write head in a controlled (closed-loop) manner (e.g., at a constant velocity or along a velocity profile) across the disk surface while the disk is spinning (step 610).

After all of the spirals have been written, a small band of conventional servo information (e.g., embedded servo information) is written onto the disk surface (e.g., near its inner diameter or the outer diameter) using the STW (step 620). In one case, a portion of the small band of conventional servo information is written at a radial location that overlaps with a radial location where spiral servo information has been written.

The small band of conventional servo information provides an absolute reference point (in both the radial and circumferential sense) on the disk surface. More specifically, conventional servo sectors in the small band of conventional servo information include both a track number (to provide a radial reference point) and a sector number (to provide a circumferential reference point). Final servo patterns may be written relative to this absolute reference point.

It should be understood that there are other techniques for providing an absolute reference point on the disk surface. One such technique is described in U.S. patent application Ser. No. 10/859,061 filed Jun. 2, 2004, which is incorporated herein by reference. U.S. Provisional Patent Application Ser. No. 60/475,126 filed Jun. 2, 2003 (from which the above-identified patent application claims priority) is also incorporated by reference.

Next, the disk drive is moved out of the first station and into another station, so as to free-up the STW for other disk drives. At the second station (e.g., a script write station), which includes a host connection, self-servo writing instructions and other information (e.g., drive firmware, self-test script, read channel parameter tables and defect management lists) are written into a utility zone, which is comprised of a portion (e.g., a few tracks) of the small band of conventional servo information (step 630).

In one case, the self-servo writing instructions and other information may be written to a temporary utility zone and then moved to a final (or permanent) utility zone as discussed in U.S. patent application Ser. No. 10/859,058 filed on Jun. 2, 2004, which is incorporated herein by reference. U.S. Provisional Patent Application Ser. No. 60/475,097 filed Jun. 2, 2003 (from which the above-identified patent application claims priority) is also incorporated by reference. The temporary utility zone (or temporary utility area) and the permanent utility zone (or permanent utility area) are shown in FIG. 6A, which is described below.

It should be noted that, prior to writing any information into the utility zone, the read head becomes ready on the small band of conventional servo information and the small band of conventional servo information (including the utility zone) is scanned for defects. Areas containing flaws are mapped out, so that they will not be used.

There are several techniques for bringing the read head to a ready position on the small band of servo information. One technique is described in U.S. Provisional Patent Application Ser. No. 60/475,039 entitled "BEMF Controlled Push Off/Acquire" filed Jun. 2, 2003, which is incorporated herein by reference.

Next, the disk drive is moved to a third station (e.g., a self-test station), where no host connection or other mechanical components need to access the drive. The disk drive is powered-on (e.g., with its normal supplies of +12V and +5V) and reads the self-servo writing information included in the utility zone, so as to undergo a self-servo write process using the spirals of servo information (step 640). In one embodiment, the final servo pattern looks like the conventional servo pattern of FIG. 3.

It should be noted that, prior to reading the self-servo writing information, the read head becomes ready (as in station 2) on the small band of servo information and locks to the absolute reference point (i.e., in time and position). Then, the drive code, manufacturing diagnostic code and self-test script (among which the self-servo writing information is included) are read.

Although three different stations were described, it should be understood that other configurations are possible. That is, more or less stations may be provided and certain operations may be combined or divided between stations.

It should also be understood that features described herein may be used in the absence of writing a small band of conventional servo information onto the disk surface.

FIG. 6A is a simplified diagrammatic representation of a portion of a disk surface 210, wherein the disk surface 210 is shown in linear, instead of arcuate, fashion for ease of depiction. The disk surface 210 has an inner diameter (ID), an outer diameter (OD), an area of STW-written servo information 660, an area of self-servo written servo information 670, a temporary utility zone 680 and a permanent utility zone 690.

The area of STW-written servo information 660 is the small band of conventional servo information, discussed above. The temporary utility zone 680 is located within the area of STW-written servo information 660.

The area of self-servo written information 670 formerly included spirals of servo information, discussed above. The permanent utility zone 690 is located within the area of self-servo written servo information 670. It should be noted that, for clarity, FIG. 6A is not drawn to scale.

At least one prior technique requires drives to be identified before the script write process. Such technique also requires the drives to be routed to use different sets of scripts, codes or even different production lines. One prior process flow is shown in FIG. 7.

Disk drives (both newly built and reprocessed drives) are delivered to the script write station (step 705). Each disk drive includes a serial number capable of being read by a bar code scanner (or similar device). At the script writer, each disk drive (regardless of whether it is a new built drive or reprocessed drive) is scanned by an operator using a barcode scanner (step 710). The serial number of the drive is cross-referenced with a FIS (factory information system) database. A determination is made, based upon the information in the FIS database, as to whether the drive is a newly built drive or not (step 715).

If the drive is a newly built drive, then the operator routes the drive to a new build line and the drive is processed with script B (step 720). More specifically, script B includes the information necessary for the drive to perform a self-servo write operation, which is written into the temporary utility area. The drive then undergoes self-test procedures and a determination is made as to whether the drive failed or passed such self-test procedures (step 725).

If the drive passes the self-test procedures, then the drive is considered to be a finished good (step 790). If the drive fails the self-test procedures, a disposition action is carried out based upon the reason for the failure (e.g., if the drive failed due to a bad head, then the head may be changed). Then, the drive is again delivered to the script write station (step 705).

After the drive's serial number is cross-referenced with the FIS database (step 710), a determination is made as to whether the drive is a newly built drive (step 715). In this case, since the drive is not a newly built drive, the operator routes the drive to a reprocess line, which is a different line in production.

A determination is then made as to whether the drive failed during the self-propagation (or fill) process (step 730). This information is provided from the FIS database. If the drive failed during fill process, the disk drive is processed with script A (step 735), which is different from script B. Script A includes the information necessary to perform a self-servo write operation.

The drive then undergoes self-test procedures and a determination is made as to whether the drive failed or passed such self-test procedures (step 740). If the drive passes the self-test procedures, then the drive is considered to be a finished good. If the drive fails the self-test procedures, a disposition action is carried out based upon the reason for the failure (e.g., if the drive failed due to a media problem, then the media may be changed and the media may be required to be sent back to the STW to have servo information placed on it). Next, the drive is again delivered to the script write station (step 705).

If the drive did not fail during the fill process of step 730, then the drive is processed with script C (step 745), which is different from script B and script A. Specifically, script C does not include information necessary to perform a self-servo write operation, since it is likely that the fill has already been performed.

The drive then undergoes self-test procedures and a determination is made as to whether the drive failed or passed such self-test procedures (step 750). If the drive passes the self-test procedures, then the drive is considered to be a finished good. If the drive fails the self-test procedures, a disposition action is carried out based upon the reason for the failure. Next, the drive is again delivered to the script write station (step 705).

The process described in connection with FIG. 7 has several disadvantages. First, two different manufacturing lines are required, namely, a new build line and a reprocess line. In one case, there may be seven new build lines and one reprocess line.

Second, three sets of scripts are required to be maintained (e.g., scripts A, B, and C). Accordingly, whenever a change is made to one of the scripts, corresponding changes must be made to the other scripts.

Third, operator intervention is required to determine whether the drive is a newly built drive or a reprocessed drive. Accordingly, valuable manpower is being wasted, as compared to using an automated system, and the process is subject to human error.

In view of the above, factory productivity may be reduced, resource costs may be increased, and the complexity of the process may be increased.

Accordingly, it would be useful to provide a method and apparatus for performing a spiral self-servo write operation in a disk drive using an auto detection scheme.

SUMMARY OF THE INVENTION

The embodiments of the present invention are designed to meet some or all of the aforementioned, and other, needs.

A method and apparatus for performing a spiral self-servo write operation in a disk drive using an auto detection scheme is disclosed. In one embodiment, a disk surface has a write head associated therewith. The write head is used to write spiral servo information and a propagation state indicator onto the disk surface. The spiral servo information and propagation state indicator are used to perform a self-servo write operation on the disk surface.

By using the present embodiments, instead of providing a newly built drive line (or lines) and a reprocess line, in some embodiments, only a single line is provided. Furthermore, instead of requiring three scripts, in some embodiments, only one script is required to be maintained by the script writing. In addition, an operator is not required to scan bar code information to determine whether to place the drive in a new build line or a reprocess line.

Other embodiments, objects, features and advantages of the embodiments of the present invention will be apparent from the following specification taken in conjunction with the following drawings.

DETAILED DESCRIPTION OF THE PREFERRED EMBODIMENT

Figure 1:
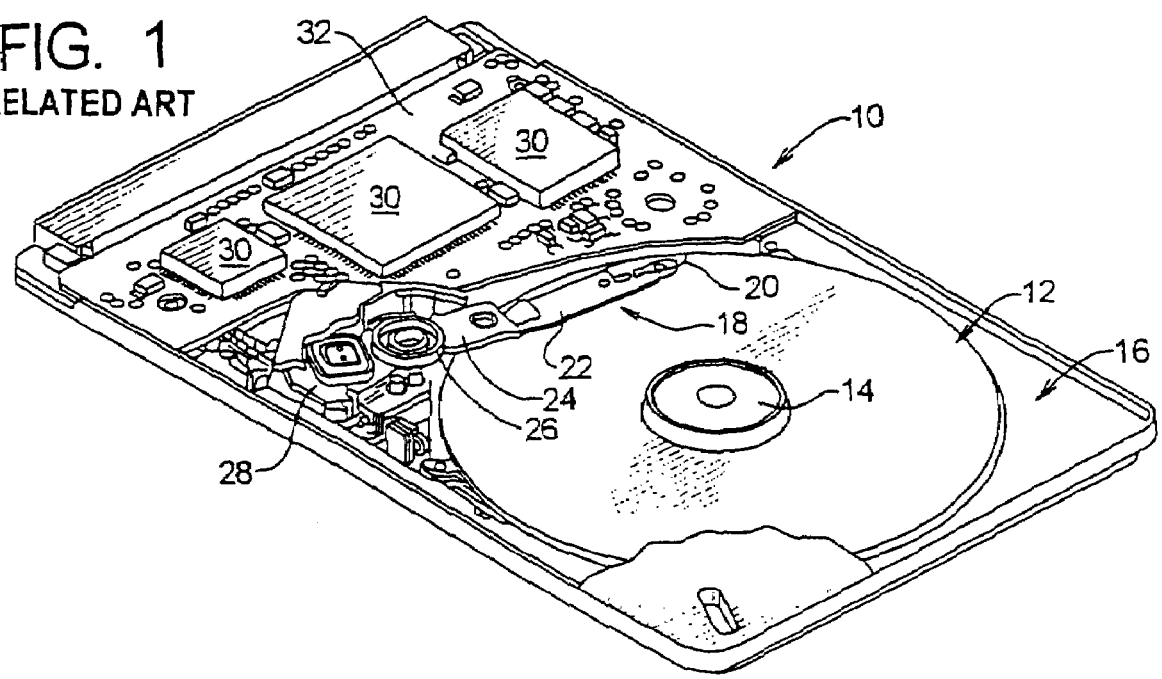
FIG. 1 is a diagrammatic representation illustrating a conventional disk drive with its top cover removed.
Figure 2:
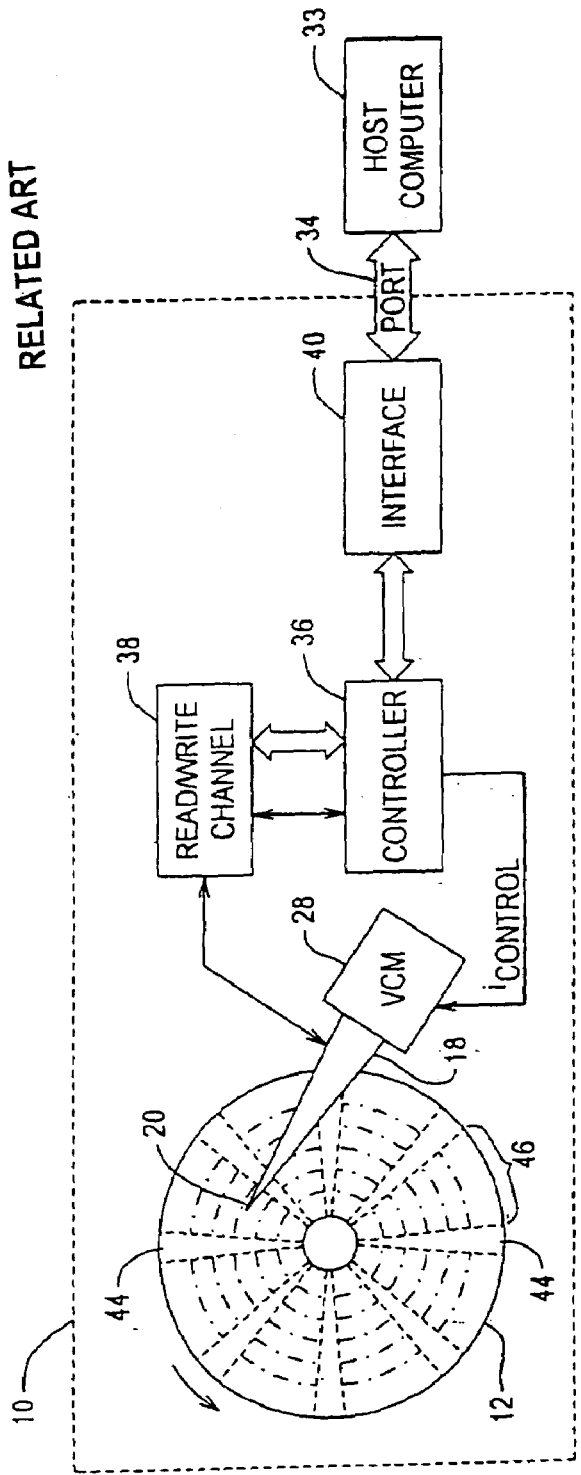
FIG. 2 is a functional block diagram which illustrates a conventional disk drive that is coupled to a host computer via an input/output port.
Figure 3:
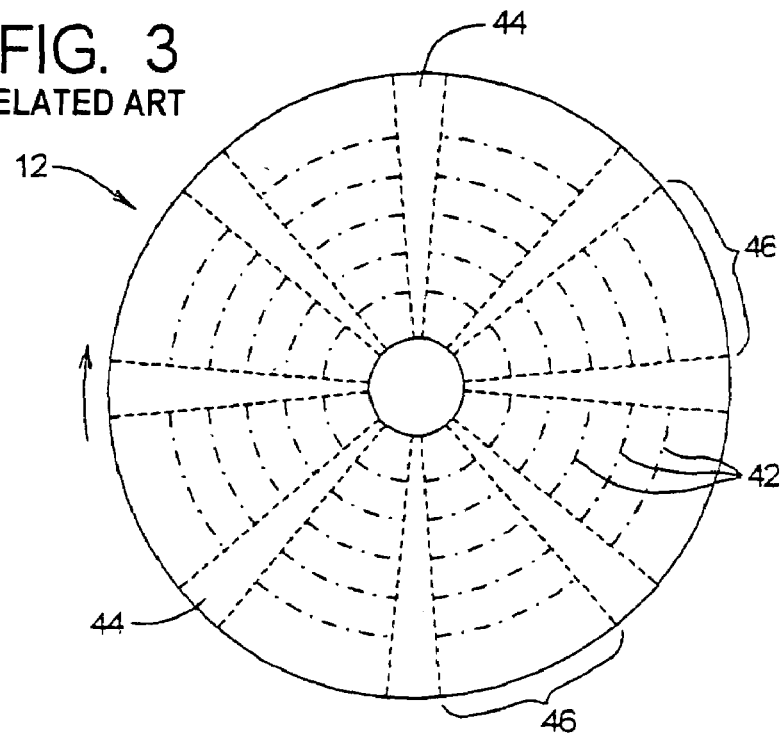
FIG. 3 is a diagrammatic representation of a top view of a magnetic storage disk illustrating a typical organization of data on a disk surface.
Figure 4:
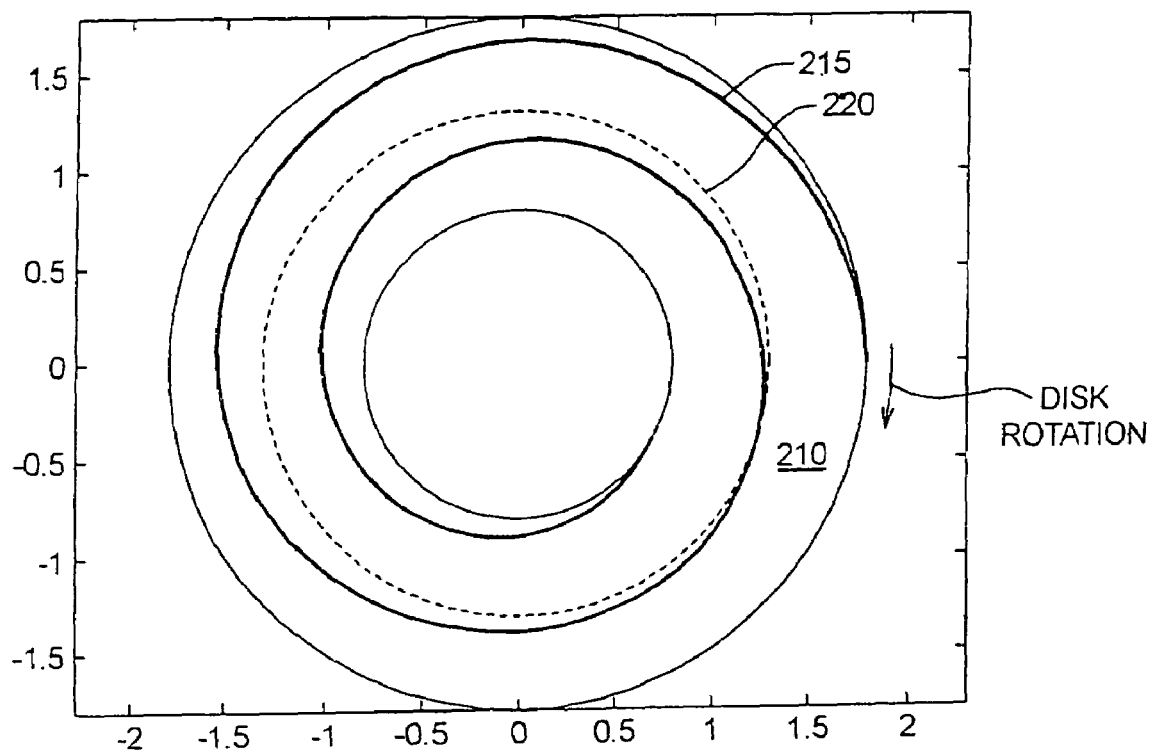
FIG. 4 is a diagrammatic representation of a disk surface having a spiral of servo information written thereon, along with a circular data storage track.
Figure 5:
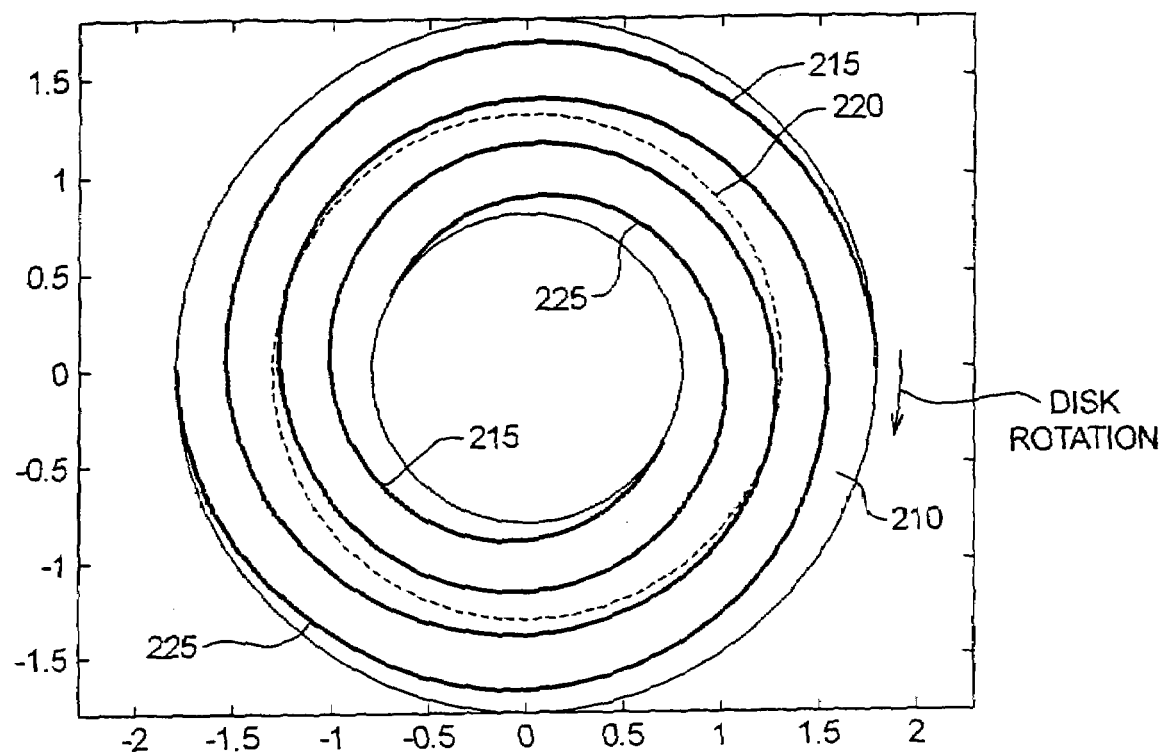
FIG. 5 is a diagrammatic representation of a disk surface having two spirals of servo information written thereon, along with a circular data storage track.

While embodiments of the present invention are susceptible of many different forms, there are shown in the drawings and will herein be described in detail, preferred embodiments of the invention with the understanding that the present disclosure is to be considered as an exemplification of the principles of the embodiments and is not intended to limit the broad aspects of the embodiments to those illustrated.

The present embodiments are directed to a method and apparatus for performing a spiral self-servo write operation in a disk drive using an auto detection scheme. Some embodiments of the present invention are shown in flowchart form in FIG. 8. Importantly, the present embodiments make use of a propagation state indicator, which includes information that is recorded onto the disk surface.

Figure 8:
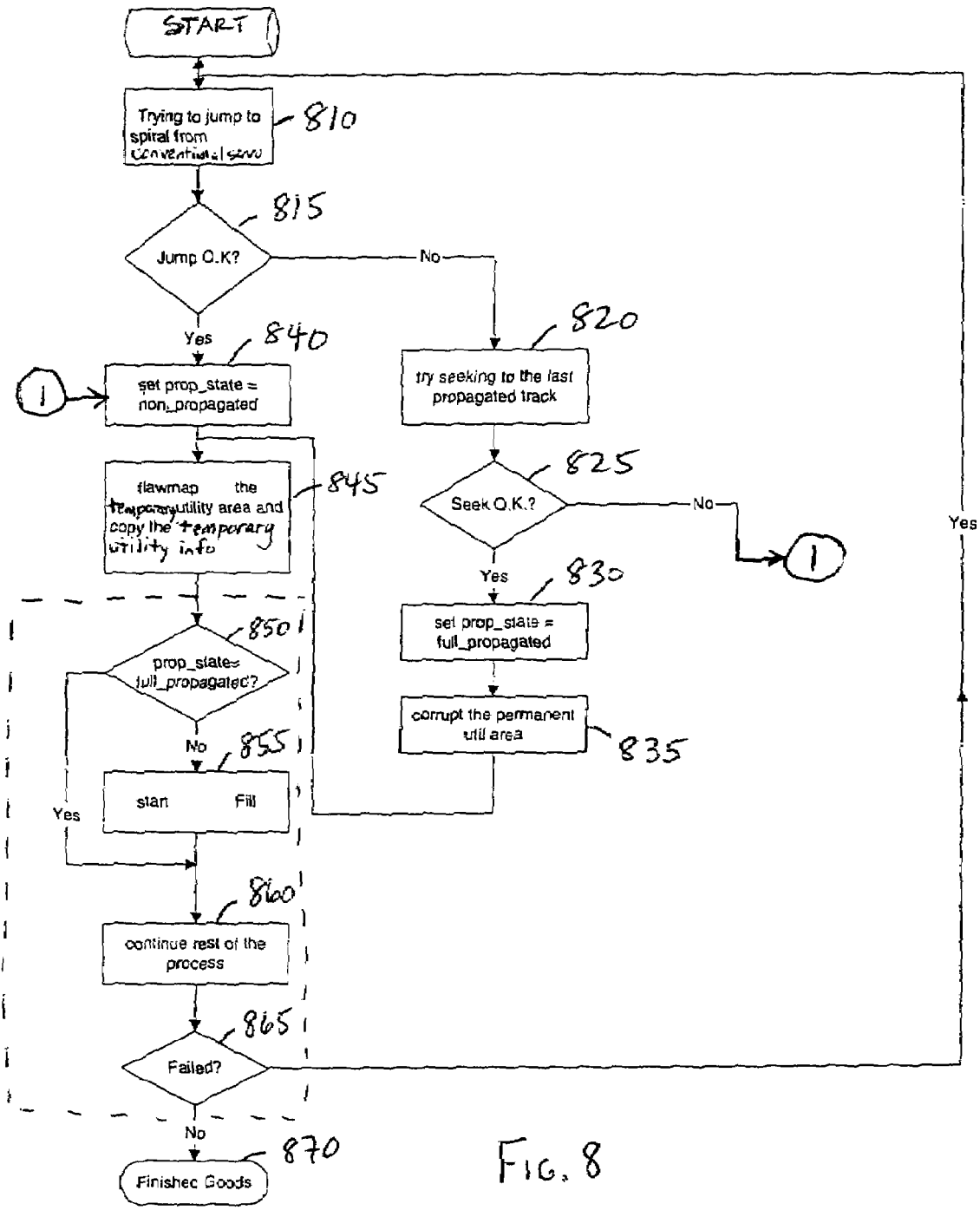
FIG. 8 is a flowchart illustrating embodiments of the present invention.

Referring now to FIG. 8, when drives are processed in the scriptwriter, a jump to spiral (moving from conventional servo information to spiral servo information) command is issued (step 810). The jump can be performed using a number of techniques. Reference is made to U.S. patent application Ser. No. 10/858,846 filed Jun. 2, 2004, which discloses a technique for acquiring spiral servo information and which is incorporated herein by reference.

A determination is made as to whether the jump from the conventional servo information to the spiral servo information was successful (step 815). If the jump was not successful, it could mean that the drive has previously been propagated (self-servo written) and, thus, only has conventional servo information written thereon (e.g., no spiral servo information). On the other hand, the jump may have not been successful due to some other reasons (e.g., poor quality of spiral servo information, high spiral runout, etc.).

An attempt is made to seek to the last propagated track (i.e., the last track of conventional servo information) in the appropriate propagation direction (step 820). A determination is made as to whether all of the tracks have been written based upon the seek (step 825).

If all of the tracks have been written, then the propagation state indicator is set to fully propagated (step 830). The permanent utility area is then corrupted (e.g., erased) (step 835) to make sure it cannot be read. This step is performed to prevent the drive from reading from the permanent utility area during power-up in the self-test rack. More specifically, with the dual-utility area layout of the spiral self-servo write process, the drive starts the self-test from the temporary utility area. Next, the temporary utility area is flawmapped and the script is copied into the temporary utility area (step 845).

Once the script has been written to the temporary utility area, the drive is moved to the self-test station (the dashed lines indicate a division between the script write station and the self-test station). A determination is then made as to whether the drive has been fully-propagated (step 850). If the drive has been fully propagated, the self-test process continues without any further self-servo writing of conventional servo patterns (step 860).

A determination is then made as to whether the drive has passed or failed the self-test process (step 865). If the drive did not fail the self-test process, the drive is considered to be a finished good (step 870). On the other hand, if the drive failed the self-test process, then the flow reverts to step 810 after a diagnostic analysis is performed and changes are made to the drive (e.g., head change, media change, etc.).

Returning to step 815, if the jump from conventional servo information to spiral servo information was successful, then the propagation state indicator is set to non-propagated (step 840). In this case, the temporary utility area is flawmapped and the script is copied to the temporary utility area (step 845).

The drive is then moved to the self-test station and a determination is made as to whether the propagation state indicator is fully propagated (step 850). In this case, it is not (i.e., the propagation state indicator is non-propagated), so the fill process is started (step 855). Once the fill process has been completed, self-test procedures are performed on the drive (step 860) and a determination is made as to whether the drive has passed or failed the self-test procedures (step 865). Depending on such determination, the flow is to either step 870 or step 810 as described above.

Returning now to step 825, if it is determined that not all of the tracks have been written based upon the seek of step 820, then the propagation state indicator is set to non-propagated (step 840). The flow continues to step 845 as described above.

It should be noted that, in some embodiments, a third propagation state may be used. That is, the seek may indicate that some, but not all, of the final servo patterns have been written. In such case, the propagation state indicator may be set to partially-propagated. The drive may then be able to continue the self-servo writing process from "where it left off" (based upon the last track to which a seek could be performed). Accordingly, factory throughput may be increased.

As set forth in FIG. 8, at the beginning of self-test, the drive powers up and reads the temporary utility information (script and code), plus the propagation state indicator. Depending on the state of the propagation state indicator at a time immediately prior to the fill step, the fill step will either be performed or bypassed.

Figure 6:
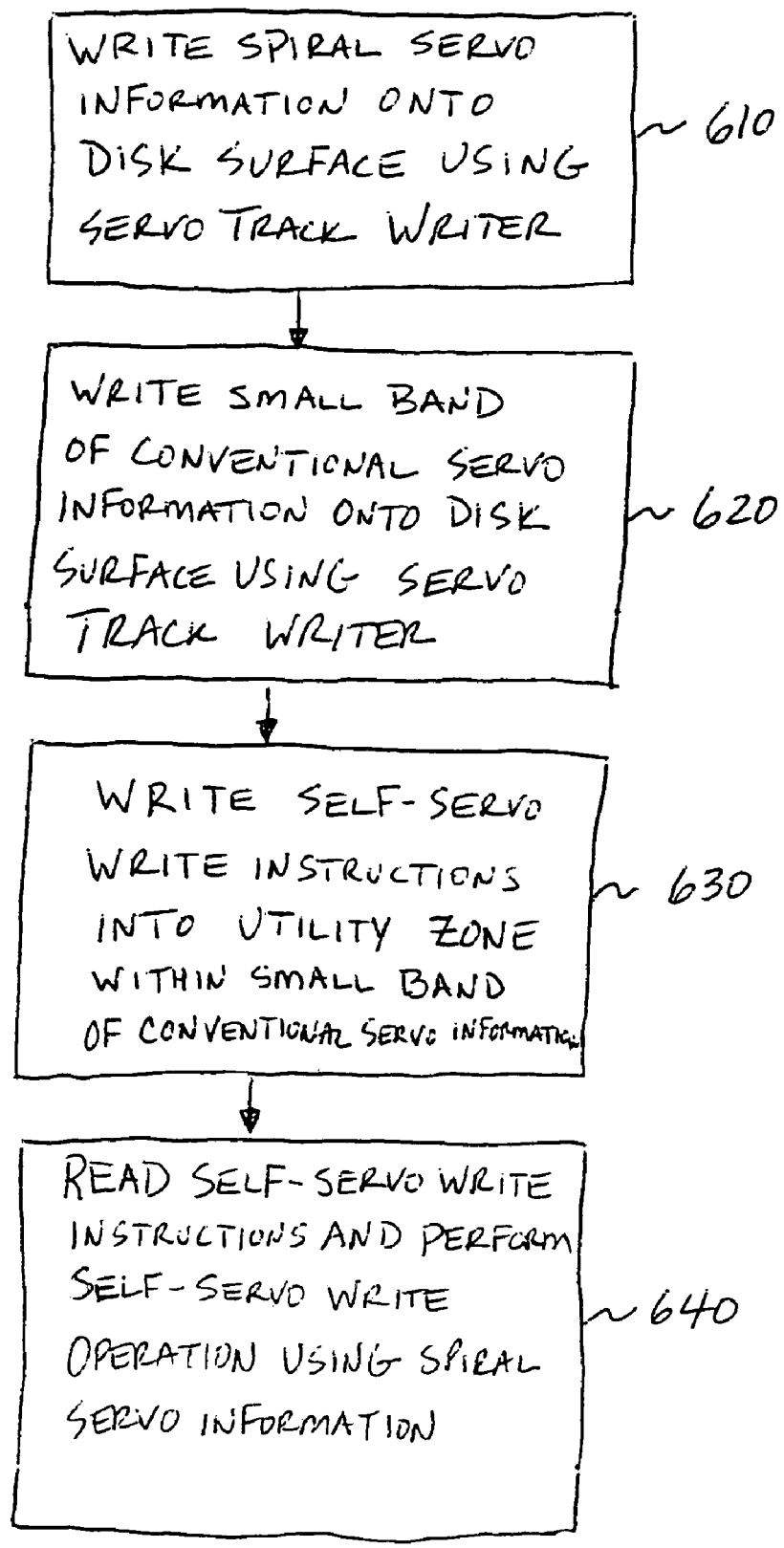
FIG. 6 is a flowchart providing an overview of a spiral self-servo writing technique.
Figure 6A:
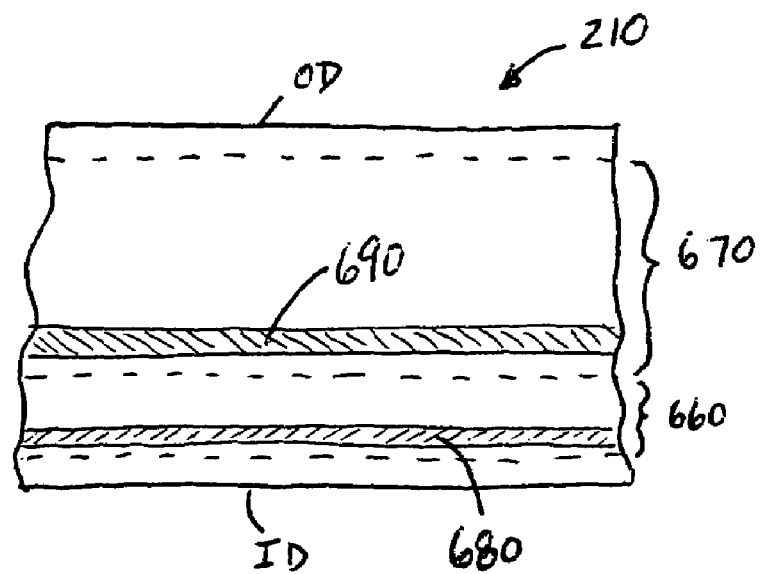
FIG. 6A is a simplified diagrammatic representation of a portion of a disk surface, wherein the disk surface is shown in linear, instead of arcuate, fashion for ease of depiction.
Figure 9:
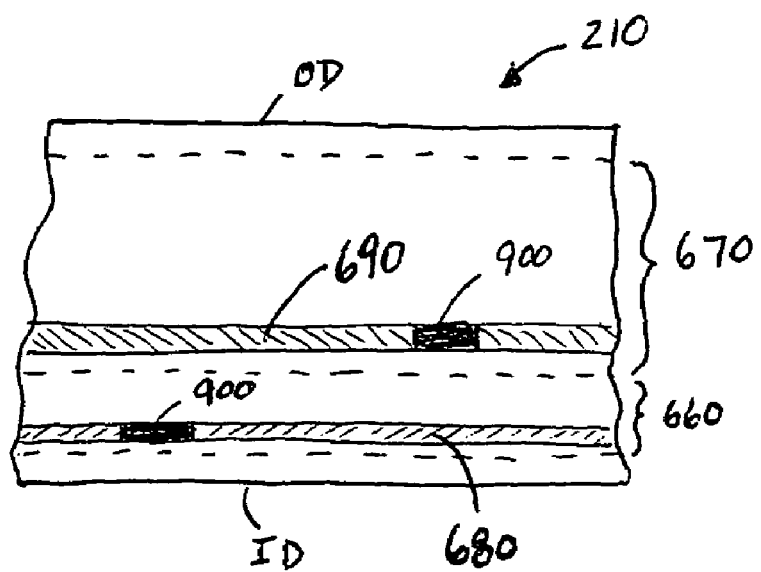
FIG. 9 is a diagrammatic representation of a portion of a disk surface, similar to FIG. 6A, which illustrates representative storage locations of a propagation state indicator.
Figure 7:
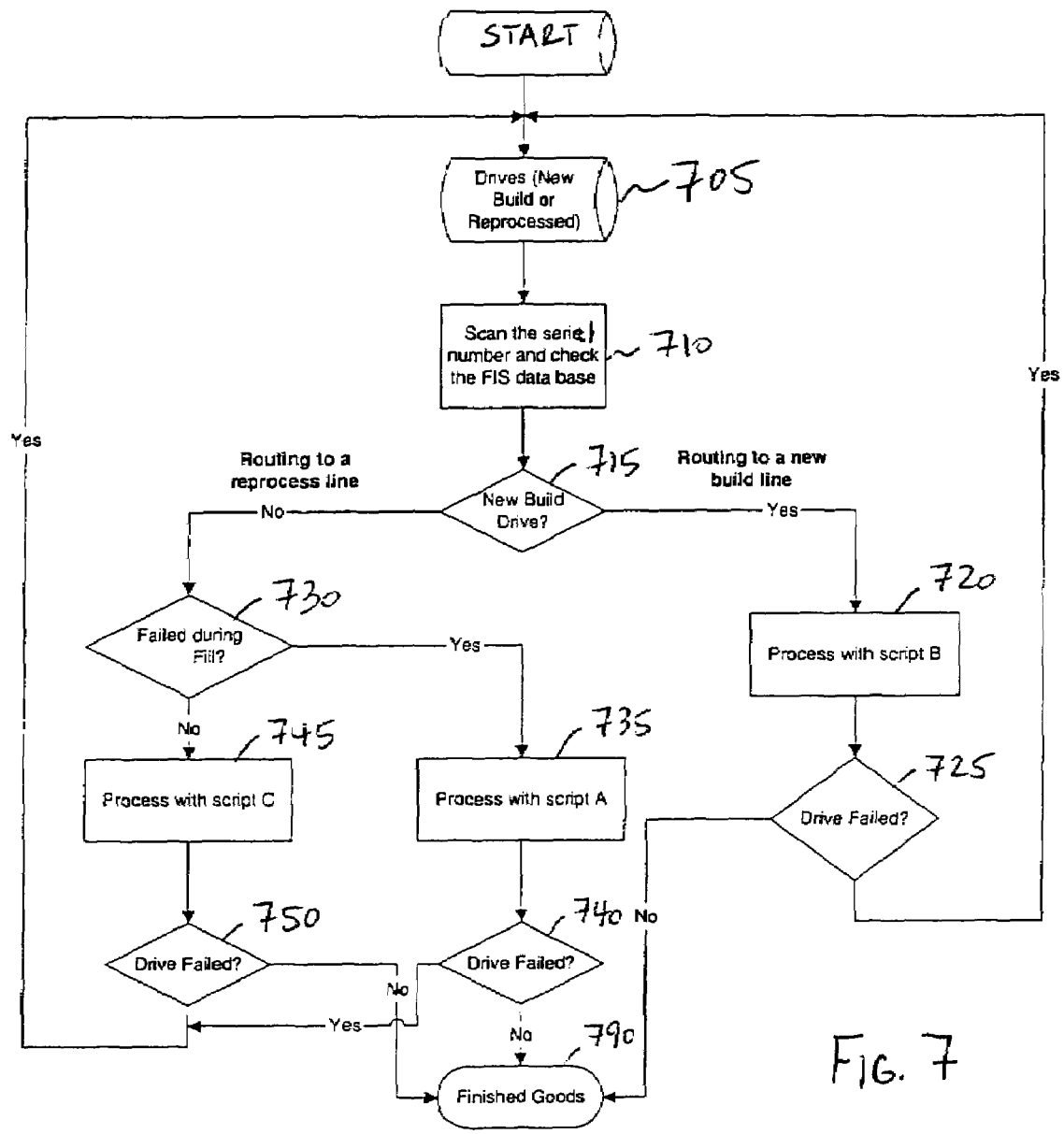
FIG. 7 is a flowchart illustrating a spiral self-servo writing process flow without auto-detection.

FIG. 9 is a diagrammatic representation of a portion of a disk surface 210, similar to FIG. 6A, which illustrates representative storage locations of a propagation state indicator 900. As mentioned above, the propagation state indicator 900 is stored on the disk surface 210. For example, the propagation state indicator 900 is stored in the temporary utility zone 680. As another example, the propagation state indicator 900 is stored in the permanent utility zone 690. As another example, the propagation state indicator 900 is copied from the temporary utility zone 680 to the permanent utility zone 690.

While an effort has been made to describe embodiments of the present invention, other alternatives will readily come to mind to those skilled in the art. Therefore, it should be understood that the embodiments may be embodied in other specific forms without departing from the spirit or central characteristics thereof. The present examples and embodiment, therefore, are to be considered in all respects as illustrative and not restrictive, and the embodiments of the present invention are not intended to be limited to the details given herein.

What is claimed is:

1. A method comprising the steps of:
   providing a disk surface and a write head associated therewith;
   writing a propagation state indicator onto the disk surface; and
   writing spiral servo information onto the disk surface using the write head.

2. The method of claim 1, comprising using the spiral servo information to perform a self-servo write operation on the disk surface.

3. The method of claim 1, wherein the propagation state indicator indicates a propagation state of the disk surface.

4. The method of claim 1, wherein the propagation state indicator indicates that the disk surface is in a non-propagated state.

5. The method of claim 1, wherein the propagation state indicator indicates that the disk surface is in a fully-propagated state.

6. The method of claim 1, wherein the propagation state indicator indicates that the disk surface is in a partially-propagated state.

7. The method of claim 1, comprising writing the propagation state indicator onto the disk surface in a temporary utility zone on said disk surface.

8. The method of claim 7, comprising copying the propagation state indicator from the temporary utility zone to a permanent utility zone on said disk surface.

9. The method of claim 1, comprising writing the propagation state indicator in a permanent utility zone.

10. The method of claim 1, comprising performing a fill process based upon a state of the propagation state indicator.

11. The method of claim 1, wherein a fill process is resumed based upon a state of the propagation state indicator.

12. An apparatus comprising:
    a disk surface and a write head associated therewith; and
    a propagation state indicator written onto the disk surface, wherein spiral servo information is written onto the disk surface using the write head.

13. The apparatus of claim 12, wherein the spiral servo information is used to perform a self-servo write operation on the disk surface.

14. The apparatus of claim 12, wherein the propagation state indicator indicates a propagation state of the disk surface.

15. The apparatus of claim 12, wherein the propagation state indicator indicates that the disk surface is in a non-propagated state.

16. The apparatus of claim 12, wherein the propagation state indicator indicates that the disk surface is in a fully-propagated state.

17. The apparatus of claim 12, wherein the propagation state indicator indicates that the disk surface is in a partially-propagated state.

18. The apparatus of claim 12, configured for performing a fill process based upon a state of the propagation state indicator.

19. The method of claim 2, wherein the propagation state indicator indicates a propagation state of the disk surface.

20. The method of claim 2, wherein the propagation state indicator indicates that the disk surface is in a non-propagated state.

21. The method of claim 2, wherein the propagation state indicator indicates that the disk surface is in a fully-propagated state.

22. The method of claim 2, wherein the propagation state indicator indicates that the disk surface is in a partially-propagated state.

23. The method of claim 2, comprising storing the propagation state indicator in a temporary utility zone on the disk surface.

24. The method of claim 23, comprising copying the propagation state indicator from the temporary utility zone to a permanent utility zone on the disk surface.

25. The method of claim 2, comprising storing the propagation state indicator in a permanent utility zone on the disk surface.

26. The method of claim 2, comprising performing a fill process based upon a state of the propagation state indicator.

27. The method of claim 2, comprising resuming a fill process based upon a state of the propagation state indicator.

28. A method comprising the steps of:
providing a disk surface and a write head associated therewith; and
writing a propagation state indicator onto the disk surface, wherein the propagation state indicator indicates that the disk surface is in a non-propagated state.

29. The method of claim 28, comprising storing the propagation state indicator in a temporary utility zone on the disk surface.

30. The method of claim 29, comprising copying the propagation state indicator from the temporary utility zone to a permanent utility zone on the disk surface.

31. The method of claim 28, wherein comprising storing the propagation state indicator in a permanent utility zone.

32. The method of claim 28, comprising performing a fill process based upon a state of the propagation state indicator.

33. The method of claim 28, wherein comprising resuming a fill process based upon a state of the propagation state indicator.

34. A method comprising the steps of:
providing a disk surface and a white head associated therewith; and
writing a propagation state indicator onto the disk surface, wherein the propagation state indicator is written in a temporary utility zone on the disk surface.

35. The method of claim 34, wherein the propagation state indicator indicates a propagation state of the disk surface.

36. The method of claim 35, wherein the propagation state indicator indicates that the disk surface is in a non-propagated state.

37. The method of claim 35, wherein the propagation state indicator indicates that the disk surface is in a fully-propagated state.

38. The method of claim 35, wherein the propagation state indicator indicates that the disk surface is in a partially-propagated state.

39. The method of claim 34, comprising copying the propagation state indicator from the temporary utility zone to a permanent utility zone on the disk surface.

40. The method of claim 34, comprising performing a fill process based upon a state of the propagation state indicator.

41. The method of claim 34, comprising resuming a fill process based upon a state of the propagation state indicator.

42. A method comprising the steps of:
providing a disk surface and a write head associated therewith; and
writing a propagation state indicator onto the disk surface, wherein the propagation state indicator is written in a permanent utility zone on the disk surface.

43. The method of claim 42, wherein the propagation state indicator indicates a propagation state of the disk surface.

44. The method of claim 43, wherein the propagation state indicator indicates that the disk surface is in a non-propagated state.

45. The method of claim 43, wherein the propagation state indicator indicates that the disk surface is in a fully-propagated state.

46. The method of claim 43, wherein the propagation state indicator indicates that the disk surface is in a partially-propagated state.

47. The method of claim 42, comprising performing a fill process based upon a state of the propagation state indicator.

48. The method of claim 42, comprising resuming a fill process based upon a state of the propagation state indicator.

49. A method comprising the steps of:
providing a disk surface and a write head associated therewith; and
writing a propagation state indicator onto the disk surface, and performing a fill process based upon a state of the propagation state indicator.

50. The method of claim 49, comprising resuming a fill process based upon a state of the propagation state indicator.

51. A method comprising the steps of:
providing a disk surface and a write head associated therewith; and
writing a propagation state indicator onto the disk surface, wherein a previously started fill process is resumed based upon a state of the propagation state indicator.

52. The apparatus of claim 12, configured for writing the propagation state indicator in a temporary utility zone on the disk surface.

53. The apparatus of claim 52, wherein the propagation state indicator is copied from the temporary utility zone to a permanent utility zone on the disk surface.

54. The apparatus of claim 12, wherein the propagation state indicator is stored in a permanent utility zone on the disk surface.

55. The apparatus of claim 12, configured for resuming a fill process based upon a state of the propagation state indicator.

56. The apparatus of claim 13, wherein the propagation state indicator indicates a propagation state of the disk surface.

57. The apparatus of claim 13, wherein the propagation state indicator indicates that the disk surface is in a non-propagated state.

58. The apparatus of claim 13, wherein the propagation state indicator indicates that the disk surface is in a fully-propagated state.

59. The apparatus of claim 13, wherein the propagation state indicator indicates that the disk surface is in a partially-propagated state.

60. The apparatus of claim 13, configured for performing a fill process based upon a state of the propagation state indicator.

61. The apparatus of claim 13, wherein the propagation state indicator is stored in a temporary utility zone on the disk surface.

62. The apparatus of claim 61, configured for copying the propagation state indicator from the temporary utility zone to a permanent utility zone on the disk surface.

63. The apparatus of claim 13, wherein the propagation state indicator is stored in a permanent utility zone on the disk surface.

64. The apparatus of claim 13, configured for resuming a fill process based upon a state of the propagation state indicator.

65. An apparatus comprising:
a disk surface and a write head associated therewith; and
a propagation state indicator written onto the disk surface by the head, wherein the propagation state indicator indicates that the disk surface is in a non-propagated state.

66. The apparatus of claim 65, configured for performing a fill process based upon a state of the propagation state indicator.

67. The apparatus of claim 65, wherein the propagation state indicator is stored in a temporary utility zone.

68. The apparatus of claim 67, wherein the propagation state indicator is copied from the temporary utility zone to a permanent utility zone.

69. The apparatus of claim 65, wherein the propagation state indicator is stored in a permanent utility zone.

70. An apparatus comprising:
a disk surface and a write head associated therewith; and
a propagation state indicator written onto the disk surface by the head, wherein a fill process is performed or not based upon a state of the propagation state indicator.

71. The apparatus of claim 70, wherein the propagation state indicator is stored in a temporary utility zone.

72. The apparatus of claim 71, wherein the propagation state indicator is copied from the temporary utility zone to a permanent utility zone.

73. The apparatus of claim 70, wherein the propagation state indicator is stored in a permanent utility zone.

74. The apparatus of claim 70, wherein the fill process is resumed based upon a state of the propagation state indicator.

* * * * *